Oct. 28, 1969     F. E. WATKINS     3,474,861
FLOW CONTROL VALVE
Filed Nov. 25, 1968

Fred E. Watkins
INVENTOR.

BY

ATTORNEYS 3,474,861
FLOW CONTROL VALVE
Fred E. Watkins, Houston, Tex., assignor to Camco, Incorporated, Houston, Tex., a corporation of Texas
Continuation-in-part of application Ser. No. 671,271, Sept. 27, 1967. This application Nov. 25, 1968, Ser. No. 778,429
Int. Cl. E21b 43/00; F16k 31/22
U.S. Cl. 166—224
4 Claims

ABSTRACT OF THE DISCLOSURE

A flow control valve limiting the flow of fluid in a production string in a petroleum well having a valve seat positioned in a flow passageway, a float positioned in the passageway below the valve seat in which at least one telescoping section, below the valve seat and about the passageway and float, is removably supported by the housing whereby the size of the passageway about the float may be conveniently sized such that when the flow rate of fluid through the passageway reaches the desired maximum the fluid flow will raise the float onto the seat closing the passageway. A tubular member slidably extending downwardly through and protecting the valve seat from abrasive fluid flow.

CROSS-REFERENCE TO RELATED APPLICATION

This application is a continuation-in-part application of my co-pending patent application Ser. No. 671,271, filed Sept. 27, 1967 entitled "Flow Control Valve."

BACKGROUND OF THE INVENTION

It is common practice in the production of petroleum products such as oil or gas to provide a flow control valve or safety valve located within the production string in the well that will allow the passage upwardly of normally produced flow rates, but in the event that the flow rate should increase to some undesired predetermined value, the flow control valve will close causing the flow through the production string to be sealed off thereby preventing a blowout. Most of the flow control valves in present use required substantial pressure drop thereby causing high fluid pressure velocities through the flow control valve. These high velocities are imparted to the produced petroleum which includes sand which in turn causes erosion and eventual malfunction of the flow control valve. Furthermore, such flow control valves are not conveniently adjustable for easily controlling the flow rate of fluid allowed through the valve.

SUMMARY

The present invention is directed to providing a flow control valve for limiting the flow of fluid in a production string in a petroleum well by providing a passageway having a valve seat therein with the float positioned below the valve seat and adapted to coact with the seat to close the passageway when the flow rate therethrough increases to some predetermined value and in which at least one telescoping section is provided below the valve seat and about the passageway and float, and is removably supported by the housing whereby the size of the passageway about the float may be conveniently sized such that when the flow rate of fluid through the passageway reaches the desired maximum the fluid flow will raise the float onto the seat closing the passageway.

A further object of the present invention is the provision of a plurality of telescoping tubular sections below the valve seat and about the float whereby the size of the passageway about the float may be selected to control the flow rate at which the valve closes.

Yet a still further object of the present invention is the provision of a flow limiting control valve in which a tubular member slidably extends downwardly through and protects the valve seat from abrasive flow and protects the valve seat by having a sufficient weight or by being yieldably held in a downward position by a spring during normal flow conditions.

BRIEF DESCRIPTION OF THE DRAWINGS

In the attached drawing, like character references refer to like parts throughout the several views in which.

DESCRIPTION OF THE PREFERRED EMBODIMENT

Figure 1:
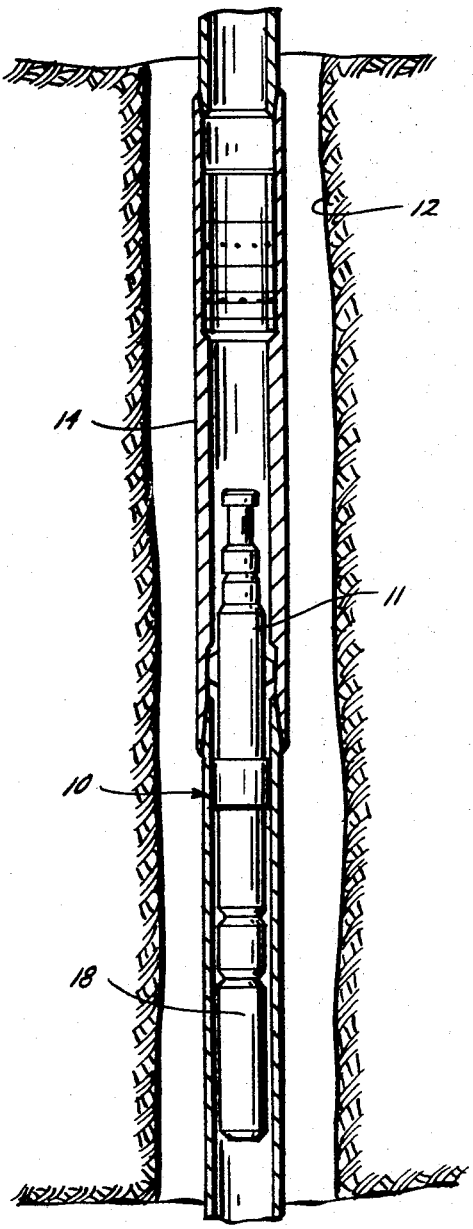
FIGURE 1 illustrates a production string in a petroleum well in which the flow valve of the present invention is located.

Referring now to the drawing, particularly to FIGURE 1, a conventional production string 10 is shown in a well bore producing petroleum products such as oil and gas from a well bore 12. As previously noted, it is conventional to locate within the production string 10 a flow limit control valve or safety valve 18 set in the tubing string 10 by conventional wireline setting tools to limit the flow rate of fluid through the production string 10, which valve will close if the rate increases to some predetermined value. For example, the safety valve 18 may be connected to Camco M lock 11 which is a conventionally set in a Camco Magnaset nipple 14 and no further description is believed necessary.

Figure 2:
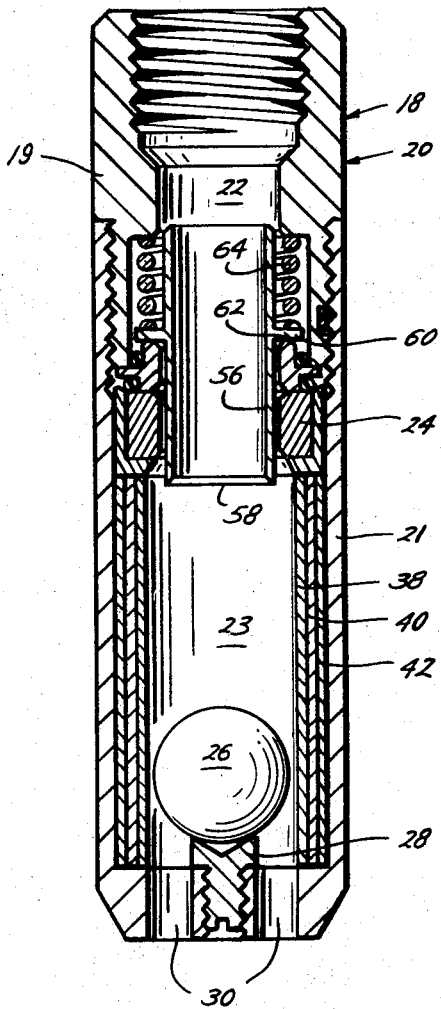
FIGURE 2 is an enlarged elevational view, in cross section, of a flow control valve of the present invention.

Referring now to FIGURE 2, the flow limiting control valve, generally indicated by the numeral 18, generally includes a housing 20 including upper portion 19 and lower portion 21 having a passageway 22 therethrough, a valve seat 24 in the passageway, and a float 26 in the passageway positioned below the valve seat 24. The passageway 22 includes a lower portion 23 positioned below the valve seat 24. The lower end of the housing 20 includes a support means 28 to retain the float 26 in the lower portion 23 of the housing passageway 22. The lower end of the passageway 22 communicates with inlets 30 from the interior of the lower end of the production string 10. Thus, as production fluid flows upwardly in the production string 10, the fluid passes through the inlets 30 into the passageway 22 and upwardly into the upper portion of the production string 10. Thus, a pressure drop is created across the float 26 since the only force preventing the float 26 from rising with the flow of fluid therethrough is the weight of the float. The float 26 will rise in the portion 23 of the passageway 22 when the flow acting in the annulus between the float 26 and the interior walls of the passageway portion 23 produces a pressure drop which also acts on the float 26 sufficient to offset the float's weight. By making the float 26 a ball or other configuration that contains a surface for coacting and sealing with the valve seat 24 so that the float 26 will rise and seal against the seat 24 at a desired maximum rate of flow, a flow limiting control valve is provided that is rate sensitive. Since the float 26 will become unstable and move upwardly onto the seat 24 when a particular pressure drop is generated across the float, and since the rate of flow is governed by the pressure drop in the annulus between the float 26 and the walls of the surrounding passageway portion 23, it is noted that the maximum rate of flow at which the valve closes can be controlled by adjusting the size of the annular area between the float 26 and the walls of the passageway portion 23 since the force required to raise the float against the seat 24 is essentially constant for all conditions of flow.

Thus controlling the annulus or annular area between the float 26 and the walls of the passageway 23 determines the flow rate at which the float 26 contacts and seals on the seat 24. One structure for controlling the cross-sectional area of the passageway beneath the seat 24 is by providing at least one telescoping section such as tubular sections 38, 40 and 42. Thus by unthreading lower housing section 21 from upper housing section 19, one or more of the tubular sections 38, 40 and 42 may either be added or removed to reduce or increase the cross-sectional area of the passageway portion 23. Of course, the telescoping sections 38, 40 and 42 may be omitted entirely for suitably sizing the passageway 23 by the interior of lower housing portion 21 for controlling the desired flow rate.

To protect the valve seat 24 from the cutting action of solid particles in the fluid flow from the producing formation 12, a tubular shield 56 may be provided which slidably extends through the valve seat 24 so that its lower end 58 extends below the valve seat 24 when the shield 56 is in the lowermost position. The weight of the tubular member 56 may be provided such that the shield 56 offsets any forces tending to move it upwardly by the flowing fluids under normal flow conditions and therefore the shield 56 remains in its lowermost position causing the impingement of flow and solid particles to be absorbed by the lower end 58 of the shield 56. The shield 56 is prevented from passing downwardly to the valve seat 24 as a stop shoulder 60 thereon contacts a coacting shoulder 62 on the body 20. However, as the float 26 rises up in the passageway 23 and makes contact with the lower end 58 of the shield 56, the shield 56 is moved upwardly by the closing force allowing the float 26 to make contact and seal against the valve seat 24.

If desired, a spring 64 may be provided between the body 20 and the tubular shield member 56 to assist in maintaining the shield 56 in a downward position for higher flow rates. Thus the spring 64 yieldingly holds the tubular member 56 in a downward position, but again as the float 26 is pushed upwardly on a predetermined maximum flow rate it contacts the lower end of the shield 56 and moves it upwardly against the spring 64 and allows the float to seat on the valve seat 24.

The present invention, therefore, is well adapted to carry out the objects and attain the ends and advantages mentioned as well as others inherent therein.

What is claimed is:
1. A flow control valve for limiting the flow of fluid in a production string in an oil or gas well comprising,
   a housing adapted to be sealably positioned in said production string and having a passageway therethrough for the flow of well fluid,
   a valve seat in said passageway,
   a float adapted to seat on the valve seat and close said passageway and positioned in said passageway below said valve seat,
   support means connecting to the lower end of the housing for retaining the float in said housing passageway,
   at least one telescoping section below the valve seat and about the passageway and float and removably supported by the housing whereby the size of the passageway about the float may be conveniently sized such that when the flow rate of fluid through the passageway reaches the desired maximum the fluid flow will raise the float onto the seat closing the passageway.
2. The apparatus of claim 1 wherein the telescoping sections are tubular.
3. The apparatus of claim 1 including
   a tubular member slidably extending downwardly through and protecting the valve seat from abrasive fluid flow.
4. The apparatus of claim 3 including,
   spring means in said housing acting against the tubular member for yieldably holding the member in a downward position until moved upwardly by the float.

References Cited
UNITED STATES PATENTS

| | | | |
|---|---|---|---|
| 2,696,218 | 12/1954 | Fanshier | 137—519.5 X |
| 3,273,650 | 9/1966 | Alexander et al. | 166—225 |
| 3,279,545 | 10/1966 | Page | 166—224 |
| 3,385,372 | 5/1968 | Knox | 166—225 |

DAVID H. BROWN, Primary Examiner

U.S. Cl. X.R.

137—519.5